UNITED STATES PATENT OFFICE.

JOHN D. PRINCE, JR., OF PROVIDENCE, RHODE ISLAND.

IMPROVEMENT IN THE IRON-LIQUOR EMPLOYED BY DYERS AS A MORDANT FOR DYEING BLACK.

Specification forming part of Letters Patent No. 2,060, dated April 24, 1841.

*To all whom it may concern:*

Be it known that I, JOHN D. PRINCE, Jr., of Providence, in the State of Rhode Island, have invented or discovered a new and improved mode of producing a black color in the operation of dyeing by a combination of ingredients not heretofore employed, in the manner and for the purpose discovered and adopted by me.

The common mordant used in dyeing various articles of a black color is, as is well known, an acetate of iron, and the best effect of this mordant is obtained when, by the action of the air, a mixture or compound of the protoxide and peroxide of iron is formed on the substance to be dyed. I have ascertained by repeated trials that the protosulphate of iron (copperas) may be advantageously substituted for the acetate of iron as a mordant by bringing it into that state which shall cause it to deposit these two compounds—the protoxide and peroxide of iron—on the goods under treatment. There are various articles which effect this purpose to a certain extent; but that which I have found to do so in the most perfect manner is the arsenious acid (arsenic) mixed or combined with the protosulphate. The proportions of the two ingredients admit of considerable latitude; but the following has been found to answer well: I dissolve one pound of copperas in a gallon of water, and in another gallon of water I dissolve four ounces of white arsenic, and then mix the two solutions, which mixture constitutes my iron-liquor.

For the purpose of transportation it is desirable to obtain the ingredients from which the solution is to be made in a dry state. For this purpose I take copperas and drive off its water of crystallization by exposing it to heat upon iron plates or in any other convenient mode, and to the dried mass I add four ounces of white arsenic for every pound of copperas first taken. The whole is then reduced to powder and may be readily converted into iron-liquor by adding the proper quantity of water. The tendency of the protoxide in copperas is to pass too rapidly and completely into the state of peroxide, by which the object of obtaining a good black color is defeated, an injurious brown tint being produced. The arsenious acid has the property of preventing this peroxidation, and of inducing that state of mixed oxide upon which the perfection of the black is dependent, and this combination of arsenious acid and its application to the purpose of producing a black color are, as I believe, entirely new.

Having thus fully described the nature of my invention, what I claim therein, and desire to secure by Letters Patent, is—

The combining of arsenious acid with sulphate of iron in the manner and for the purpose herein fully made known, and this I claim, whether the two substances are mixed in a dry state and afterward dissolved, or whether the two substances be separately dissolved and afterward mixed together; nor do I intend to limit myself to the proportionate quantities of the two substances herein stated as being generally used, but intend to vary these proportions within any limits which I may find to be advantageous.

J. D. PRINCE, Jr.

Witnesses:
   THOS. P. JONES,
   J. W. PATTERSON.